(12) United States Patent
Vandebeuque et al.

(10) Patent No.: US 8,490,485 B2
(45) Date of Patent: Jul. 23, 2013

(54) RESONATOR FOR A VIBRATORY SENSOR OF AN ANGULAR PARAMETER

(75) Inventors: Paul Vandebeuque, Paris (FR); Alain Jeanroy, Paris (FR)

(73) Assignee: Sagem Defense Securite, Paris (FR)

( * ) Notice: Subject to any disclaimer, the term of this patent is extended or adjusted under 35 U.S.C. 154(b) by 804 days.

(21) Appl. No.: 12/559,784

(22) Filed: Sep. 15, 2009

(65) Prior Publication Data

US 2010/0083758 A1 Apr. 8, 2010

Related U.S. Application Data

(60) Provisional application No. 61/172,480, filed on Apr. 24, 2009.

(30) Foreign Application Priority Data

Sep. 16, 2008 (FR) ..................................... 08 05054

(51) Int. Cl.
*G01C 19/00* (2006.01)

(52) U.S. Cl.
USPC ...................................................... 73/504.13

(58) Field of Classification Search
USPC ................... 73/504.12, 504.13, 1.77, 504.02, 73/503.3, 504.08, 504.18, 514.15
See application file for complete search history.

(56) References Cited

U.S. PATENT DOCUMENTS

| 4,157,041 A * | 6/1979 | Loper et al. ................. 73/504.13 |
| 4,793,195 A * | 12/1988 | Koning ......................... 74/5.6 D |
| 4,951,508 A * | 8/1990 | Loper et al. ................. 73/504.13 |
| 5,712,427 A * | 1/1998 | Matthews .................... 73/504.04 |
| 6,272,925 B1 * | 8/2001 | Watson ........................ 73/504.12 |
| 6,550,329 B1 * | 4/2003 | Watson ........................ 73/504.13 |
| 6,662,656 B2 * | 12/2003 | Jeanroy ....................... 73/504.02 |
| 7,010,977 B2 * | 3/2006 | Renault ....................... 73/504.13 |
| 7,127,946 B2 * | 10/2006 | Renault ....................... 73/504.13 |
| 7,222,513 B2 * | 5/2007 | Caron et al. ................... 73/1.77 |
| 7,281,426 B1 * | 10/2007 | Chikovani et al. .......... 73/504.13 |
| 7,617,727 B2 * | 11/2009 | Watson ........................ 73/504.13 |
| 7,621,184 B2 * | 11/2009 | Caron ......................... 73/504.13 |
| RE42,731 E * | 9/2011 | Watson ........................ 73/504.12 |
| 8,109,145 B2 * | 2/2012 | Stewart ....................... 73/504.13 |
| 8,186,219 B2 * | 5/2012 | Caron et al. ................. 73/504.13 |
| 2001/0042403 A1 * | 11/2001 | Watson ........................ 73/504.02 |
| 2003/0010120 A1 * | 1/2003 | Jeanroy ....................... 73/504.02 |
| 2004/0118204 A1 * | 6/2004 | Fell et al. .................... 73/504.13 |
| 2004/0154399 A1 * | 8/2004 | Renault ....................... 73/504.13 |
| 2006/0096375 A1 * | 5/2006 | Renault ....................... 73/504.12 |
| 2006/0096376 A1 * | 5/2006 | Renault ....................... 73/504.12 |
| 2010/0024546 A1 * | 2/2010 | Challoner et al. ........... 73/504.08 |
| 2010/0154542 A1 * | 6/2010 | Okon et al. ................. 73/504.12 |
| 2011/0083508 A1 * | 4/2011 | Ragot ......................... 73/504.12 |

FOREIGN PATENT DOCUMENTS

EP 1445580 A1 8/2004

* cited by examiner

*Primary Examiner* — Peter MacChiarolo
*Assistant Examiner* — Samir M Shah
(74) *Attorney, Agent, or Firm* — Muncy, Geissler, Olds & Lowe, PLLC

(57) ABSTRACT

A resonator for an angular parameter sensor, the resonator comprising a bell of electrically-insulating material provided with a central stem and an electrically-conductive layer, the conductive layer comprising branches extending from a central portion of the bell to a peripheral edge of the bell, the number of said branches being a prime number not less than seven.

10 Claims, 1 Drawing Sheet

RESONATOR FOR A VIBRATORY SENSOR OF AN ANGULAR PARAMETER

This Nonprovisional application claims priority of Provisional Application No. 61/172,480, filed on Apr. 24, 2009, under 35 U.S.C. 1.119(e), the entire contents of which are hereby incorporated by reference.

The present invention relates to a resonator for a vibratory sensor of an angular parameter, such as a rate gyro or a free gyro.

BACKGROUND OF THE INVENTION

In general, a resonator for a rate gyro or a free gyro comprises a hemispherical bell provided with a central stem that is fastened to a bell support part. The bell is made of an electrically-insulating material and is uniformly coated in an electrically-conductive layer so as to define electrodes at a peripheral edge of the bell, which electrodes face electrodes on a support part. The electrodes are powered to cause the bell to be deformed into an ellipse and in order to detect the orientation of the ellipse. The material used for the bell is generally silica that guarantees accuracy for the sensor by virtue of very low intrinsic damping. The conductive layer is generally made of metal, but presents the drawback of conferring both mechanical damping and electrically damping (as a result of the resistive losses produced by detection current flowing in the conductive layer in the vicinity at the equator). The quality of the resonator is thus highly influenced by the conductive layer. The damping of the vibrations also makes it necessary to increase the energy for sustaining vibration, and above all it degrades the performance of the resonator by increasing drift if the resonator presents a geometrical harmonic defect of order four.

OBJECT OF THE INVENTION

An object of the invention is to provide means for improving the quality of such resonators.

SUMMARY OF THE INVENTION

To this end, the invention provides a resonator for an angular parameter sensor, the resonator comprising a bell of electrically-insulating material provided with a central stem and an electrically-conductive layer, the conductive layer comprising branches extending from a central portion of the bell to a peripheral edge of the bell, the number of said branches being a prime number not less than seven.

Thus, the conductive layer does not cover all of the portion of the bell in the vicinity of the peripheral edge where deformation is the greatest and where damping thereof is the most penalizing, even though all that is required in order to convey current to the electrodes formed on the peripheral edge is electrical continuity. By using a number of branches that is prime and not less than seven it is possible to ensure sufficient conduction of electricity while limiting the influence of the conductive layer on the mechanical behavior of the bell. In particular, such a number limits the risk of the conductive layer giving rise to subharmonics in the first, second, third, and fourth geometric orders. This also increases tolerance to fabrication defects, and in particular to a defect in the centering of the conductive layer relative to the bell.

Preferably, the conductive layer has seven branches.

The influence of the conductive layer on the mechanical behavior of the bell is minimized and fabrication of the conductive layer remains relatively easy, particularly concerning the preparation of the mask for depositing the conductive layer.

Advantageously, the branches are of a width such that in the vicinity of the peripheral edge of the bell they present an area that is substantially equal to one-tenth of the area of the bell in the vicinity of the peripheral edge.

This embodiment presents a good compromise for obtaining low mechanical and electrical damping while ensuring that the resonator remains relatively easy to fabricate. In the vicinity of the pole of the bell, the conductive layer covers substantially all of the surface of the bell, but without penalizing the performance of the resonator, since damping at the pole of the bell has no effect on performance.

According to a particular characteristic, the conductive layer includes a portion covering at least a longitudinal portion of the stem.

This simplifies powering the resonator electrically.

According to other particular characteristics:
the branches extend substantially along meridians of the bell;
the branches have longitudinal edges that are parallel or that converge towards the peripheral edge of the bell; and
the conductive layer is made of metal, and the metal is preferably platinum.

Other characteristics and advantages of the invention appear on reading the following description of a non-limiting embodiment of the invention.

BRIEF DESCRIPTION OF THE DRAWING

Reference is made to the accompanying drawing, in which.

DETAILED DESCRIPTION OF THE INVENTION

Figure 1:
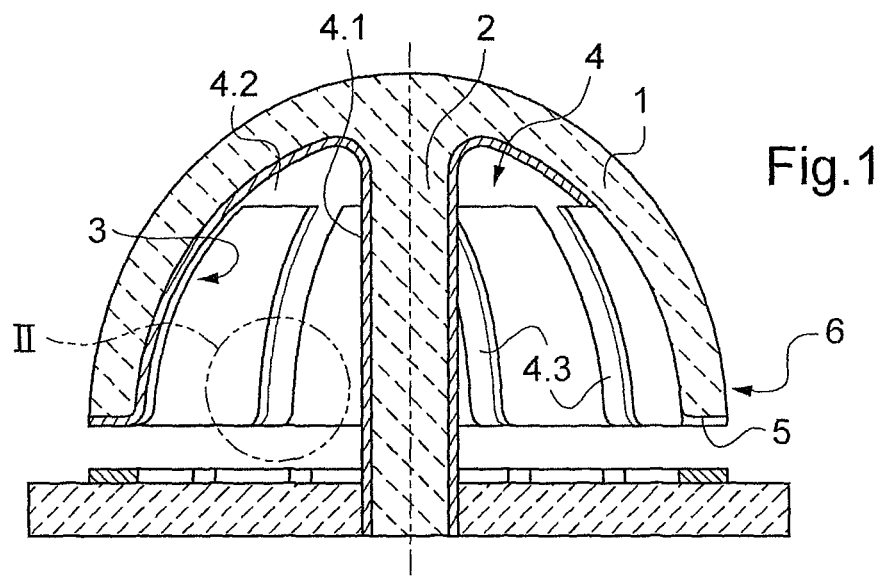
FIG. 1 is a perspective view of a resonator in accordance with the invention.
Figure 2:
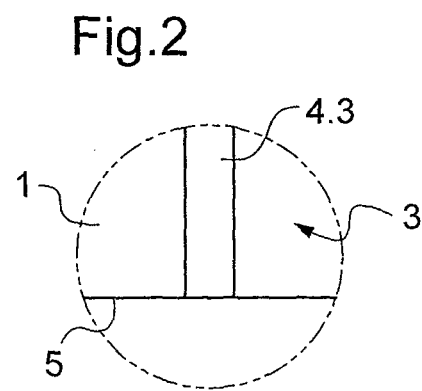
FIG. 2 is a detail view of zone II of FIG. 1.

With reference to FIGS. 1 and 2, the resonator of the invention is intended for use in known manner in an angular parameter sensor such as a free gyro or a rate gyro, both of which are devices that are known in themselves and neither the structure nor the operation thereof is described herein.

The resonator in accordance with the invention comprises a bell 1 of hemispherical shape provided at its center with a stem 2 that projects from the inside surface 3 of the bell 1. The bell 1 and the stem 2 are made by machining silica.

The resonator comprises a conductive layer given overall reference 4 and comprising a portion 4.1 covering the stem 2, an annular central portion 4.2 extending the portion 4.1 around the base of the stem 2, and seven branches 4.3 extending from the portion 4.2 to the peripheral edge 5 of the bell 1. The branches 4.3 extend substantially along meridians of the bell 1 and in this example they have parallel longitudinal edges. The width of the branches is such that, in the vicinity of the peripheral edge of the bell, they present a total area that is substantially equal to one-tenth of the area of the bell in the vicinity of the peripheral edge. In this example the width of each branch is about 1 millimeter (mm). The conductive layer 4 has a thickness of about 40 nanometers (nm).

The conductive layer 4 also defines electrodes on the peripheral edge 5, and may optionally rise over the outside surface 6 of the bell 1 in the vicinity of the peripheral edge 5.

Figure 3:
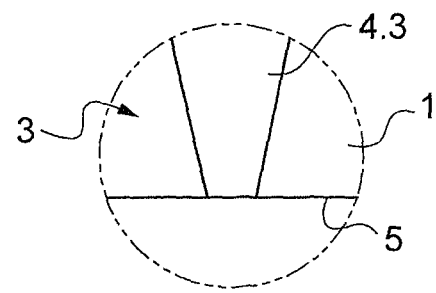
FIG. 3 is a view analogous to FIG. 2, showing a variant embodiment.

In a variant, and as shown in FIG. 3, the branches 4.3 may have longitudinal edges that converge towards each other going towards the peripheral edge 5 (the convergence is exaggerated in FIG. 3).

Naturally, the invention is not limited to the embodiment described but covers any variant coming within the ambit of the invention as defined by the claims.

In particular, the number of branches is a prime number not less than seven and it may be equal to eleven or thirteen, in particular.

The conductive layer need not include an annular central portion.

What is claimed is:

1. A resonator for an angular parameter sensor, the resonator comprising: a bell of electrically-insulating material provided with a central stem and an electrically-conductive layer, wherein the conductive layer comprises a number of branches extending from a central portion of the bell to a peripheral edge of the bell, said number of branches being a prime number not less than seven.

2. A resonator according to claim 1, wherein the conductive layer comprises seven branches.

3. A resonator according to claim 1, wherein the branches are of a width such that in the vicinity of the peripheral edge of the bell they present an area that is substantially equal to one-tenth of the area of the bell in the vicinity of the peripheral edge.

4. A resonator according to claim 1, wherein the conductive layer includes a portion covering at least a longitudinal portion of the stem.

5. A resonator according to claim 1, wherein the conductive layer includes an annular central portion.

6. A resonator according to claim 1, wherein the branches extend substantially along meridians of the bell.

7. A resonator according to claim 1, wherein the branches have parallel longitudinal edges.

8. A resonator according to claim 1, wherein the branches have longitudinal edges converging towards the peripheral edge of the bell.

9. A resonator according to claim 1, wherein the conductive layer is made of metal.

10. A resonator according to claim 9, wherein the metal is platinum.

* * * * *